(12) United States Patent
Stewart

(10) Patent No.: US 10,731,307 B2
(45) Date of Patent: Aug. 4, 2020

(54) SYSTEM FOR FLOOD CONTROL

(71) Applicant: Michael Stewart, Corona, NY (US)

(72) Inventor: Michael Stewart, Corona, NY (US)

(*) Notice: Subject to any disclaimer, the term of this patent is extended or adjusted under 35 U.S.C. 154(b) by 0 days.

(21) Appl. No.: 16/111,518

(22) Filed: Aug. 24, 2018

(65) Prior Publication Data

US 2020/0063389 A1 Feb. 27, 2020

(51) Int. Cl.
*E02B 3/10* (2006.01)
*E02B 7/20* (2006.01)

(52) U.S. Cl.
CPC .................................. *E02B 3/104* (2013.01)

(58) Field of Classification Search
CPC ................................ E02B 3/104; E02B 7/205
USPC ........................................................ 405/104
See application file for complete search history.

(56) References Cited

U.S. PATENT DOCUMENTS

| 1,768,120 | A | * | 6/1930 | Crill | ........................ | E02B 13/02 |
| | | | | | | 405/90 |
| 2,689,459 | A | * | 9/1954 | Mayo, Sr. | ................ | E02B 7/205 |
| | | | | | | 405/95 |
| 4,694,435 | A | * | 9/1987 | Magneville | .......... | G10K 11/006 |
| | | | | | | 367/154 |
| 4,970,697 | A | * | 11/1990 | Earley | .................. | G01V 1/3808 |
| | | | | | | 181/112 |
| 5,199,812 | A | * | 4/1993 | McClellan | ................ | E02B 7/44 |
| | | | | | | 405/101 |
| 5,460,462 | A | * | 10/1995 | Regan | ..................... | E02B 3/104 |
| | | | | | | 405/96 |
| 5,725,326 | A | * | 3/1998 | Van den Noort | ....... | E02B 3/104 |
| | | | | | | 405/104 |
| 6,012,337 | A | * | 1/2000 | Hodge | ................... | G01B 11/16 |
| | | | | | | 324/700 |
| 6,276,200 | B1 | * | 8/2001 | Cazden | ..................... | E04H 4/12 |
| | | | | | | 137/428 |
| 6,338,594 | B1 | * | 1/2002 | Adler | ..................... | B82Y 10/00 |
| | | | | | | 405/104 |
| 6,425,707 | B1 | * | 7/2002 | Baxter | .................... | E04H 9/145 |
| | | | | | | 405/87 |
| 6,647,161 | B1 | * | 11/2003 | Hodge | .................. | G01B 11/16 |
| | | | | | | 385/12 |
| 6,732,479 | B2 | * | 5/2004 | Nomura | .................. | E02B 3/102 |
| | | | | | | 256/13 |
| 7,658,572 | B2 | * | 2/2010 | Miyao | ..................... | E02B 7/205 |
| | | | | | | 405/104 |

(Continued)

FOREIGN PATENT DOCUMENTS

DE           19807640 A1 *   9/1998  ............. E02B 3/104

*Primary Examiner* — Benjamin F Fiorello
(74) *Attorney, Agent, or Firm* — The Iwashko Law Firm, PLLC; Lev Ivan Gabriel Iwashko

(57) ABSTRACT

A system for flood control that includes: a water sensor; a control panel, where the water sensor is connected to the control panel; and a convertible sea wall, where the convertible sea wall is adapted to toggle between an extended position and a retracted position. The system for flood control may further include a steel base structure, wherein the steel base structure houses the convertible sea wall when the convertible sea wall is in a retracted position. The steel base structure further includes hydraulic lifts within the steel base structure that lift and extend the convertible sea wall into the extended position and allows for the retraction of the sea wall to the retracted position.

7 Claims, 3 Drawing Sheets

(56) References Cited

U.S. PATENT DOCUMENTS

| | | | | |
|---|---|---|---|---|
| 7,744,310 B2* | 6/2010 | Alpern | ............... | E02B 3/104 |
| | | | | 405/103 |
| 8,500,365 B1* | 8/2013 | Vecherin | ............. | E04H 9/145 |
| | | | | 405/115 |
| 9,086,502 B2* | 7/2015 | Martinez | ............... | G01V 1/20 |
| 2005/0262776 A1* | 12/2005 | Smushkovich | ........ | E04H 9/145 |
| | | | | 52/64 |
| 2006/0250258 A1* | 11/2006 | Anhamm | ............... | E02B 7/44 |
| | | | | 340/610 |
| 2009/0169302 A1* | 7/2009 | Alpern | ............... | E02B 3/104 |
| | | | | 405/33 |
| 2009/0220301 A1* | 9/2009 | Miyao | ............... | E02B 7/205 |
| | | | | 405/21 |
| 2012/0163916 A1* | 6/2012 | Waters, Jr. | ............ | E02B 3/104 |
| | | | | 405/112 |
| 2012/0219360 A1* | 8/2012 | Morii | ............. | E02B 7/44 |
| | | | | 405/100 |
| 2013/0061522 A1* | 3/2013 | Alexander | ............. | E06B 9/04 |
| | | | | 49/11 |
| 2014/0328628 A1* | 11/2014 | Nakayasu | ............. | E02B 7/44 |
| | | | | 405/26 |
| 2015/0117952 A1* | 4/2015 | Gujer | ............. | E02B 3/104 |
| | | | | 405/96 |
| 2015/0337583 A1* | 11/2015 | Fukagawa | ............. | E02B 3/104 |
| | | | | 49/23 |
| 2016/0201281 A1* | 7/2016 | Roy | ............. | E02B 3/104 |
| | | | | 405/107 |
| 2016/0244927 A1* | 8/2016 | Adler | ............. | E02B 7/26 |
| 2017/0356149 A1* | 12/2017 | Adler | ............. | E02B 3/102 |
| 2019/0153686 A1* | 5/2019 | Adler | ............. | E03F 9/007 |

* cited by examiner

SYSTEM FOR FLOOD CONTROL

BACKGROUND OF THE INVENTION

Field of Invention

The present invention relates to a system for controlling floods and flood control through the use of a convertible sea wall.

Description of Related Art

Floods have become a predominant weather hazard in various locations throughout the world. An increase in hurricane and storm activity is causing more flooding, which can be destructive in many ways in coastal towns and cities. Some flood control techniques have been developed in the form of sea walls, that may be constructed to help prevent storm surges related to floods. However, further development and implementation of more automated and urgent sea wall protection is necessary.

It is the object of the present invention to provide a convertible sea wall system that may be extended from a retracted position to break storm surge associated with flooding.

SUMMARY OF THE INVENTION

The present invention relates to a system for flood control that includes: a water sensor; a control panel, where the water sensor is connected to the control panel; and a convertible sea wall, where the convertible sea wall is adapted to toggle between an extended position and a retracted position. The system for flood control may further include a steel base structure, wherein the steel base structure houses the convertible sea wall when the convertible sea wall is in a retracted position. The steel base structure further includes hydraulic lifts within the steel base structure that lift and extend the convertible sea wall into the extended position and allows for the retraction of the sea wall to the retracted position.

DETAILED DESCRIPTION

The present invention relates to a system that includes a water sensor assembly used in conjunction with a convertible sea wall construction aimed at preventing and blocking an approaching storm surge according to the present invention. The system according to the present invention includes a water sensor extending from a base toward a body of water. Sensors are provided along the vertical length of a sensor extension in order to provide signals to a control panel. The control panel detects these signals and may activate the convertible sea wall according to present invention as needed based upon sensor readings.

Figure 1:
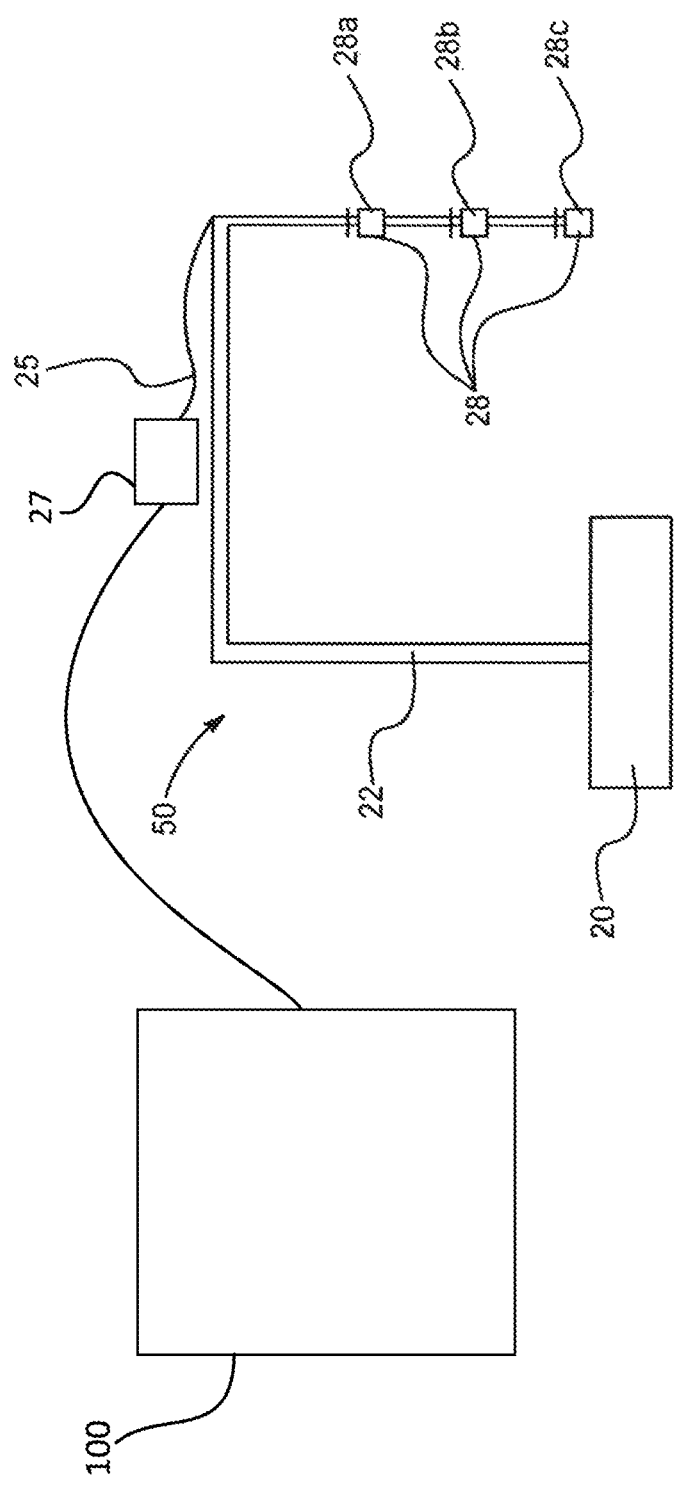
FIG. 1 depicts a sensor assembly according to the present invention.
Figure 2:
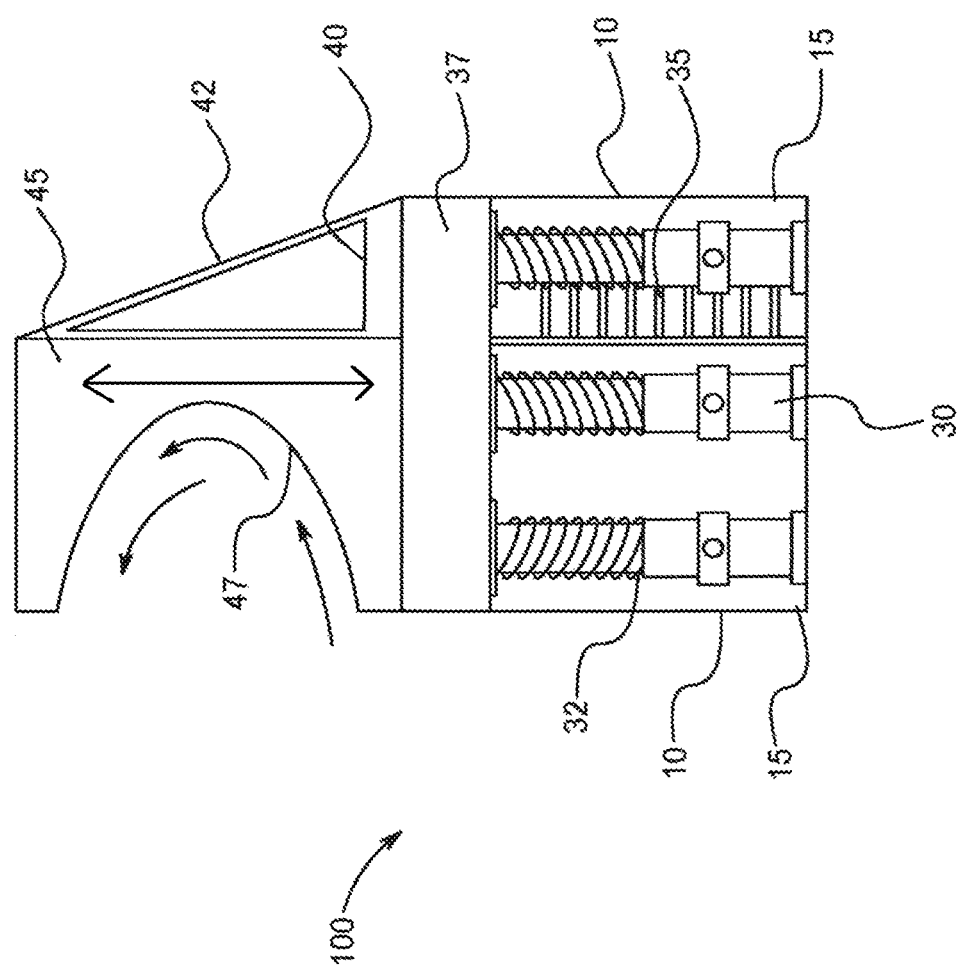
FIG. 2 depicts a convertible sea wall construction in an extended position in accordance with the present invention.

FIG. 1 depicts a sensor assembly 50 that is used in conjunction with a convertible sea wall construction 100 shown in FIG. 2. A control panel 27 receives signals from the sensor assembly 50 that may in turn activate the extension of a wave breaker or sea wall 47 shown in FIG. 2.

Figure 3:
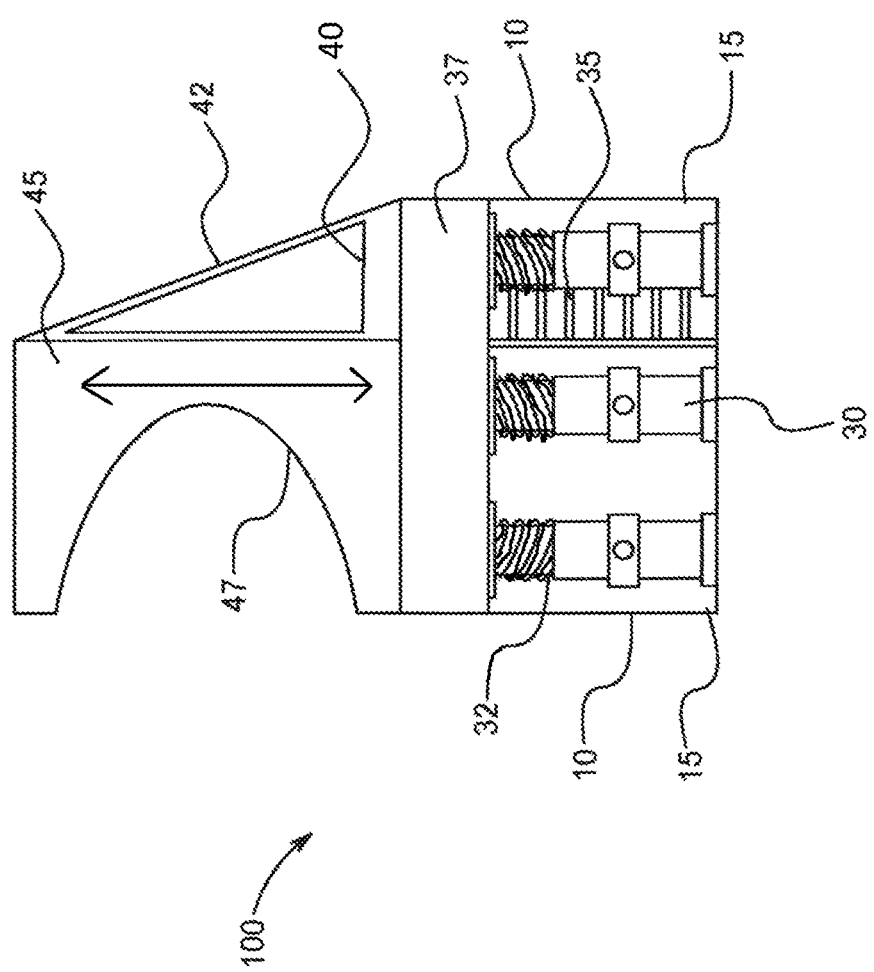
FIG. 3 illustrates the convertible sea wall construction in a retracted position in accordance with the present invention.

The sensor assembly 50 preferably includes a concrete base 20 that includes a sensory extension 22. As shown the sensory extension 22 extends vertically and then horizontally and descends vertically at the distal end thereof. The distal end includes a series of water level sensors 28 that detect water levels and transmits signals regarding water level through a wire 25 to a control panel. This sensor system is placed upon a coast associated with a body of water, and therefore provides a system to detect water levels. The sensor assembly 50 works in conjunction with sea wall assembly 100. Sea wall assembly 100 includes a steel base structure 37 that is surrounded by a concrete wall 10. This provides a sturdy base for a wave breaker 47 as shown in the extended condition in FIG. 2. The wave breaker 47 extends and retracts within the steel base structure 37 as shown in FIG. 2 and FIG. 3. Hydraulic lifts 30 are shown that lift and extend the wave breaker 47 to extended position. The wave breaker 47 is constructed of a steel plate 45 with a steel support system 42. An entry or access door 40 is provided for access into the interior of the steel base structure 37. In addition to hydraulic lifts, shock absorbing springs 32 are provided for further support of the wave breaker 47 and steel plates 45. Access into this structure is provided through a ladder 35 shown, which may be removed and retracted as desired. A steel wall 15 is on the inside of the concrete wall 10 providing further structural support of the base structure 37.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The exemplary embodiment was chosen and described in order to best explain the principles of the invention and its practical application, to thereby enable others skilled in the art to best utilize the invention and various embodiments with various modifications as are suited to the particular use contemplated.

What is claimed is:

1. A system for flood control, the system comprising:
    a sensor assembly, comprising:
        a concrete base,
        a sensor extension, comprising:
            a first portion perpendicularly disposed away from the concrete base with respect to a first direction,
            a second portion perpendicularly disposed away from the first portion with respect to a second direction, and
            a third portion perpendicularly disposed away from the second portion with respect to a third direction, such that the first portion and the third portion are in parallel, and
        a plurality of water sensors disposed on at least a portion of the third portion to detect water levels and transmit the detected water levels to a control panel, such that each of the plurality of water sensors are disposed at a different portion of the third portion with respect to another of the plurality of water sensors; and
    a convertible sea wall connected to the sensor assembly to move from retracted in a first position to at least partially extended in a second position in response to the detected water levels indicating a storm surge.

2. The system for flood control according to claim 1, further including a steel base structure, wherein the steel structure houses the convertible sea wall when the convertible sea wall is in the first position.

3. The system for flood control according to claim 2, wherein the steel base structure further includes hydraulic lifts within the steel base structure that lift and extend the convertible sea wall into the second position and allows for retraction of the convertible sea wall to the first position.

4. The system for flood control according to claim 2, wherein the steel base structure includes an outer concrete wall and a steel wall inside the concrete wall as further support structure.

5. The system for flood control according to claim 1, wherein the convertible sea wall includes a steel plate structure with a steel support on a back side of the convertible sea wall.

6. The system for flood control according to claim 5, wherein the convertible sea wall includes a curve side adapted to break an incoming wave.

7. The system for flood control according to claim 1, wherein the water sensor includes a concrete base, a sensor extension that vertically extends and horizontally extends from the concrete base further comprising a plurality of sensors at the distal end.

\* \* \* \* \*